(12) United States Patent
Melanson et al.

(10) Patent No.: US 10,571,484 B2
(45) Date of Patent: Feb. 25, 2020

(54) SYSTEMS AND METHODS FOR DETERMINING ACCELERATION BASED ON PHASE DEMODULATION OF AN ELECTRICAL SIGNAL

(71) Applicant: Cirrus Logic, Inc., Austin, TX (US)

(72) Inventors: John L. Melanson, Austin, TX (US); Anindya Bhattacharya, Austin, TX (US); Roderick D. Holley, Spicewood, TX (US); Ruoxin Jiang, Austin, TX (US); Stephen T. Hodapp, Austin, TX (US); John C. Tucker, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 1040 days.

(21) Appl. No.: 14/686,834

(22) Filed: Apr. 15, 2015

(65) Prior Publication Data

US 2015/0301077 A1   Oct. 22, 2015

Related U.S. Application Data

(60) Provisional application No. 61/980,452, filed on Apr. 16, 2014, provisional application No. 61/985,174, filed on Apr. 28, 2014, provisional application No. 62/016,320, filed on Jun. 24, 2014.

(51) Int. Cl.
*G01P 15/125* (2006.01)

(52) U.S. Cl.
CPC .................................. *G01P 15/125* (2013.01)

(58) Field of Classification Search
CPC .. G01P 15/125; G01P 15/097; G01P 15/0802; G01C 19/56; G01C 19/5719; G01C 19/5649; G01C 19/5747
See application file for complete search history.

(56) References Cited

U.S. PATENT DOCUMENTS

| 5,134,881 | A | * | 8/1992 | Henrion | ................. | F16F 15/073 73/514.35 |
| 5,241,861 | A | * | 9/1993 | Hulsing, II | ............. | F02G 1/044 73/504.04 |
| 5,336,983 | A | * | 8/1994 | Watanabe | ........... | G01P 15/0888 318/560 |

(Continued)

FOREIGN PATENT DOCUMENTS

| EP | 1688705 A2 | 8/2006 |
| GB | 1134650 | 11/1967 |

OTHER PUBLICATIONS http://uspas.fnal.gov/materials/08UCSC/mml16_modulation_and_detection.pdf (visited Apr. 16, 2014), 14 pages.

(Continued)

*Primary Examiner* — Helen C Kwok
(74) *Attorney, Agent, or Firm* — Jackson Walker L.L.P.

(57) ABSTRACT

In accordance with embodiments of the present disclosure, an apparatus for measuring acceleration may include a spring-mounted mass, a positional encoder configured to measure a position of the spring-mounted mass and output one or more signals indicative of a sine and a cosine of the position, a driver to set and maintain an oscillation of the spring-mounted mass, and a decoder configured to process the one or more signals to calculate an acceleration of the spring-mounted mass.

17 Claims, 2 Drawing Sheets

(56) References Cited

U.S. PATENT DOCUMENTS

| | | | | |
|---|---|---|---|---|
| 5,444,240 | A * | 8/1995 | Nakayama | G05B 19/21 250/231.14 |
| 5,597,955 | A * | 1/1997 | Leger | G01C 19/5607 310/333 |
| 5,637,798 | A | 6/1997 | Schatz | |
| 6,386,032 | B1 * | 5/2002 | Lemkin | G01P 15/125 73/504.02 |
| 2003/0200807 | A1 * | 10/2003 | Hulsing | G01C 19/5719 73/514.01 |
| 2004/0107068 | A1 * | 6/2004 | Chapman | G01D 5/2451 702/150 |
| 2006/0169041 | A1 * | 8/2006 | Madni | G01C 19/5607 73/504.02 |
| 2006/0225506 | A1 * | 10/2006 | Madni | G01C 19/56 73/514.29 |
| 2008/0000296 | A1 * | 1/2008 | Johnson | G01C 19/5719 73/514.18 |
| 2008/0178674 | A1 * | 7/2008 | Walmsley | G01P 15/125 73/514.01 |
| 2009/0241662 | A1 * | 10/2009 | Supino | G01C 19/5719 73/504.12 |
| 2011/0018561 | A1 * | 1/2011 | Hartwell | G01D 5/2412 324/686 |
| 2012/0085169 | A1 * | 4/2012 | Walmsley | B81B 3/0086 73/514.32 |
| 2013/0104622 | A1 * | 5/2013 | Swanson | G01P 21/00 73/1.38 |
| 2014/0062567 | A1 * | 3/2014 | Waters | G01P 15/097 327/306 |
| 2015/0377918 | A1 * | 12/2015 | Waters | G01C 19/5705 73/514.32 |
| 2016/0003618 | A1 * | 1/2016 | Boser | G01C 19/5776 73/504.12 |

OTHER PUBLICATIONS

Combined Search and Examination Report under Section 17 and 18(3), Application No. GB1506468.6, dated Dec. 14, 2015, 6 pages.
Definition of "oscillation", The New IEEE Standard Dictionary of Electrical and Electronics Terms, Fifth Ed. (1993), p. 896.

* cited by examiner

SYSTEMS AND METHODS FOR DETERMINING ACCELERATION BASED ON PHASE DEMODULATION OF AN ELECTRICAL SIGNAL

RELATED APPLICATION

The present disclosure claims priority to U.S. Provisional Patent Application Ser. No. 61/980,452, filed Apr. 16, 2014, U.S. Provisional Patent Application Ser. No. 61/985,174, filed Apr. 28, 2014, and U.S. Provisional Patent Application Ser. No. 62/016,320, filed Jun. 24, 2014, each of which are incorporated by reference herein in their entirety.

FIELD OF DISCLOSURE

The present disclosure relates in general to accelerometers, and more particularly to determining acceleration upon an accelerometer based on phase demodulation of an electrical signal measured by the accelerometer.

BACKGROUND

Some embodiments of the present disclosure relate to phase modulation and detection in an accelerometer, in which a position of an oscillating spring-mounted mass of the accelerometer is phase modulated to encode position as an instantaneous phase of a carrier wave. In phase modulation, an instantaneous carrier phase changes with the modulating waveform. For example, a sinusoidally-varying voltage $V(t)$ with amplitude $V_0$, carrier frequency $\omega_c$ which includes phase modulation may be given by the equation:

$$V(t) = V_0 \cos(\omega_c t + \Delta\phi) = V_0 \cos(\omega_c t + m \cos \omega_m t)$$

where $\omega_m$ is the modulating frequency and $m$ is the modulation index. Using known trigonometric identities, the above equation may be rewritten as:

$$\frac{V(t)}{V_0} = \cos(\omega_c t)\cos(m \cos(\omega_m t)) - \sin(\omega_c t)\sin(m \cos(\omega_m t))$$

The above expression may further be expanded with Bessel functions:

$$\cos(z \cos \theta) = J_0(z) + 2\sum_{k=1}^{\infty} -1^k J_{2k}(z) \cos(2k\theta)$$

$$\sin(z \cos \theta) = 2\sum_{k=0}^{\infty} -1^k J_{2k+1}(z) \cos((2k+1)\theta)$$

SUMMARY

In accordance with the teachings of the present disclosure, one or more disadvantages and problems associated with existing approaches to measuring acceleration may be reduced or eliminated.

In accordance with embodiments of the present disclosure, an apparatus for measuring acceleration may include a spring-mounted mass, a positional encoder configured to measure a position of the spring-mounted mass and output one or more signals indicative of a sine and a cosine of the position, a driver to set and maintain an oscillation of the spring-mounted mass, and a decoder configured to process the one or more signals to calculate an acceleration of the spring-mounted mass.

In accordance with these and other embodiments of the present disclosure, an integrated circuit may include an input for receiving one or more positional encoder signals indicative of a sine and cosine of a position of an oscillating spring-mounted mass and a decoder configured to process the one or more signals to calculate an acceleration of the oscillating spring-mounted mass.

In accordance with these and other embodiments of the present disclosure, a method may include receiving one or more positional encoder signals indicative of a sine and cosine of a position of an oscillating spring-mounted mass and processing the one or more signals to calculate an acceleration of the oscillating spring-mounted mass.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
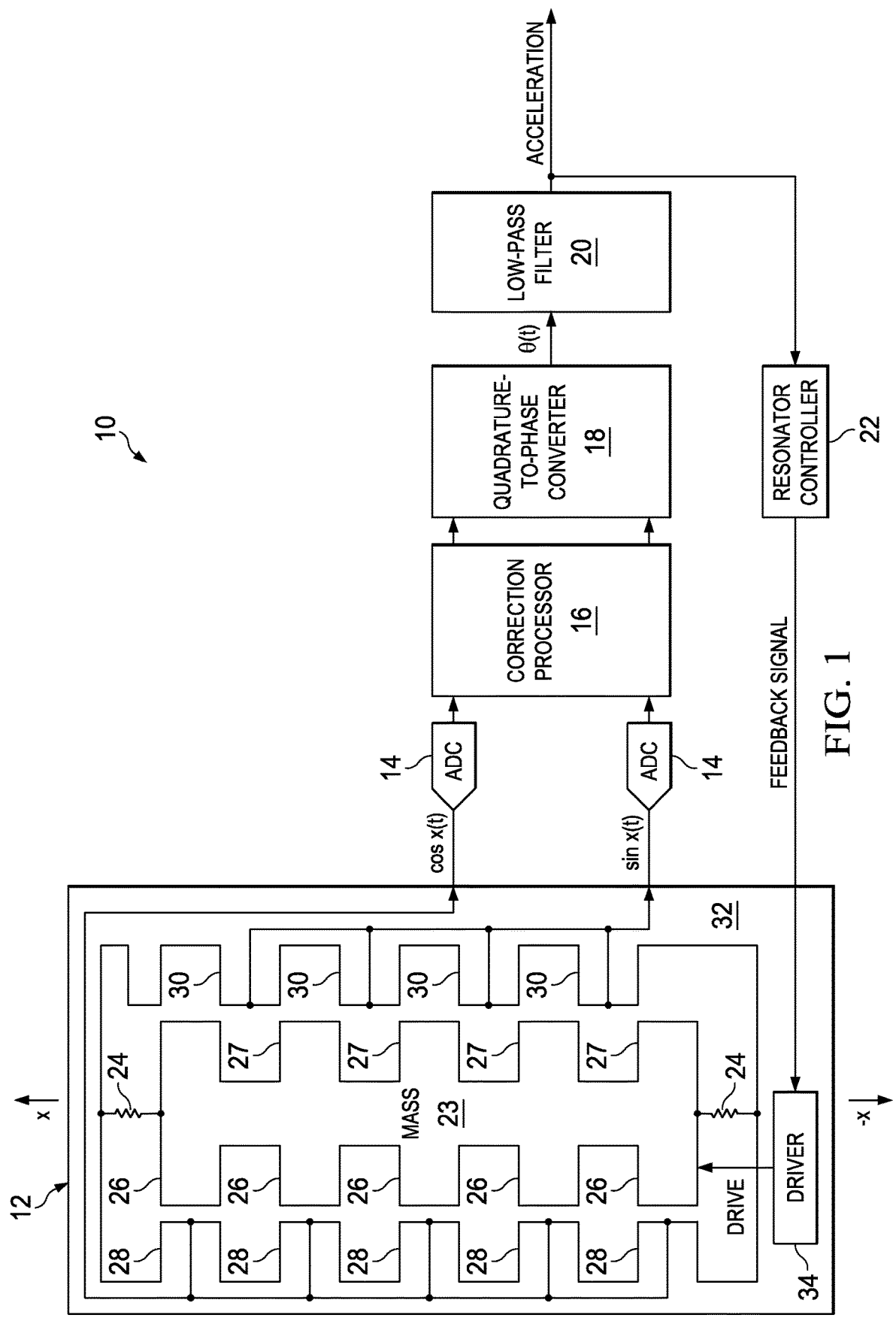
FIG. 1 illustrates an example system for determining acceleration, in accordance with embodiments of the present disclosure.

FIG. 1 illustrates an example system 10 for determining acceleration, in accordance with embodiments of the present disclosure. As shown in FIG. 1, system 10 may include an accelerometer 12, a plurality of analog-to-digital converters 14, a correction processor 16, a quadrature-to-phase converter 18, a low-pass filter 20, and a resonator controller 22. In some embodiments, all components of system 10 may be integral to the same circuit or integrated circuit. In other embodiments, some components of system 10 may be integral to different circuits or integrated circuits (e.g., accelerometer 12 may be integral to a first integrated circuit and correction processor 16, quadrature-to-phase converter 18, and low-pass filter 20 may be integral to a second integrated circuit).

As shown in FIG. 1, accelerometer 12 may comprise an accelerometer with mechanical chopping. In other embodiments, a different type of accelerometer may be used. Accelerometer 12 may comprise a spring-mounted mass 23 that may be mounted via one or more springs 24 to a stator 32. In operation, a driver 34 of accelerometer 12 may set and maintain an oscillation of spring-mounted mass 23 in the directions x and −x at a frequency $f_0$. Driver 34 may include any suitable system, device, or apparatus for setting and maintaining such operation, including a mechanical driver, electrostatic driver, or some other driver (e.g., crystal oscillator). In some embodiments, accelerometer 12 may comprise a micro-electrical mechanical system (MEMS) accelerometer.

In the embodiments represented by FIG. 1, spring-mounted mass 23 may include features 26 and 27, while stator 32 may include corresponding features 28 on one side and corresponding features 30 on another side. Such features 26, 27, 28, and 30 may be arranged (e.g., sized, shaped, and/or spaced) relative to one another such that as spring-mounted mass 23 oscillates in the directions x and −x, a capacitance between features 26 and features 28 and a capacitance between features 27 and features 30 may vary. In addition, such features 26, 27, 28, and 30 may be arranged (e.g., sized, shaped, and/or spaced) relative to one another such that as spring-mounted mass 23 oscillates in the directions x and −x, the capacitance between features 26 and features 28 may be indicative of a cosine of the position of spring-mounted mass 23 and the capacitance between features 27 and features 30 may be indicative of a sine of the position of spring-mounted mass 23. Thus, as spring-mounted mass 23 oscillates, accelerometer 12 effectively functions as a quadrature detector or position encoder that measures a position of spring-mounted mass 23 and outputs one or more signals (e.g., sin x and cos x) indicative of a sine and a cosine of the position. The detector gain may be such that more than one cycle of the encoder is traversed during every period of oscillation of spring-mounted mass 23. In addition, although the embodiments represented by FIG. 1 include a capacitive position encoder for accelerometer 12, in other embodiments the position encoder may be an optical position encoder, a magnetic position encoder, or an encoder employing optical interferometry.

The one or more signals output by the positional encoder of accelerometer 12 may be given by the equations:

$$\cos x(t) = n_1(t) + g_1 \cos(k_1 a + k_2 \sin(\omega_0 t)) \quad \text{(Eq. 1)}$$

$$\sin x(t) = n_2(t) + g_2 \sin(k_1 a + k_2 \sin(\omega_0 t + qe)) \quad \text{(Eq. 2)}$$

where $n_1(t)$ and $n_2(t)$ are additive noise (e.g., thermal, mechanical, and/or electrical noise), $g_1$ and $g_2$ are the relative gains of the two signals, qe is a quadrature error (e.g., non-90 degree phase shift) between the two signals, $\omega_0$ is the angular frequency of oscillation (e.g., $\omega_0 = 2\pi f_0$), $k_1$ and $k_2$ are constants, and a is an external acceleration (e.g., seismic acceleration, acceleration due to gravity, etc.) upon accelerometer 12. Each of the functions cos x(t) and sin x(t) given by Equations (Eqs.) 1 and 2 above are functions which may be described by phase modulation, frequency modulation, or by Bessel function, with $k_2$ as a modulation index of the phase modulation.

Each of the signals cos x(t) and sin x(t) may be converted from analog signals to corresponding digital signals by respective ADCs 14. Each ADC 14 may comprise any system, device, or apparatus suitable for converting an analog signal into an equivalent digital signal and in some embodiments may comprise a delta-sigma ADC.

As shown in FIG. 1, the positional encoder of accelerometer 12 and ADCs 14 each generates two signals. However, in some embodiments, one or both of accelerometer 12 and ADCs 14 may each generate a single signal a portion of which is indicative of cos x(t) and another portion of which is indicative sin x(t). For example, in some embodiments, functionality of accelerometer 12 and ADCs 14 may be combined into a single integrated component which outputs a single digital signal having a first portion indicative of cos x(t) and a second portion indicative of sin x(t).

Correction processor 16 may receive the digital signals representative of cos x(t) and sin x(t) and perform processing to match the gains $g_1$ and $g_2$, remove noise $n_1(t)$ and $n_2(t)$, and/or remove direct-current components (e.g., 0 hertz components) of the signals. For example, driver 34 may drive oscillation of spring-mounted mass 23 in a manner such that correction processor 16 may optimize measurement and accuracy of the ultimate acceleration measurement made by system 10. For example, the modulation index $k_2$ or excitation level of the oscillation may be set to a zero crossing in the $0^{th}$ Bessel function of the first kind for the functions given by Eqs. 1 and 2, thus resulting in little signal energy at lower frequencies and substantially zero direct current signal components. In addition, among the largest contributors of noise $n_1(t)$ and $n_2(t)$ may be 1/f or "pink" noise, which dominates at lower frequencies. Thus, correction processor 16 may high-pass filter the digital signals received from ADCs 14 to remove direct-current components and noise that dominates at lower frequencies without causing significant signal distortion.

Based on the digital signals representative of cos x(t) and sin x(t), as conditioned by correction processor 16, a decoder comprising quadrature-to-phase converter 18 and low-pass filter 20 may calculate an acceleration of spring-mounted mass 23, which may be indicative of an external acceleration applied to accelerometer 12. Quadrature-to-phase converter 18 may comprise any system, device, or apparatus configured to, using known trigonometric properties, process the digital signals representative of cos x(t) and sin x(t) to calculate a phase angle as a function of time, where such phase angle Θ(t) may be given by:

$$\Theta(t) = k_1 a + k_2 \sin(\omega_0 t) \quad \text{(Eq. 3)}$$

In some embodiments, quadrature-to-phase converter 18 may comprise an arctangent processor configured to calculate phase angle Θ(t) by calculating the trigonometric inverse of tan x(t)=sin x(t)/cos x(t). In these and other embodiments, quadrature-to-phase converter 18 may implement coordinate rotation digital computer (also known as "CORDIC" or Volder's algorithm) or a similar algorithm to calculate phase angle Θ(t) based on the signals indicative of cos x(t) and sin x(t).

From Eq. 3, it is seen that the term $k_1 a$ is a time-independent constant. Thus, low-pass filter 20 may filter Θ(t) to filter out the oscillation of the spring-mounted mass and extract the term $k_1 a$, indicative of the acceleration a (the constant $k_1$ may be calibrated or otherwise corrected for by correction processor 16).

The resulting acceleration signal may be fed back through resonator controller 22, which may generate a feedback signal to control a magnitude of the oscillation in such a manner to optimize measurement and accuracy of the acceleration, as described above (e.g., cause the modulation index $k_2$ or excitation level of the oscillation to be set to a zero crossing in the $0^{th}$ Bessel function of the first kind for the functions given by Eqs. 1 and 2). In some embodiments, the feedback signal may comprise or be indicative of a desired or target magnitude of oscillation, and driver 34 may include logic for minimizing an error between the target magnitude and the actual magnitude of oscillation.

Figure 2:
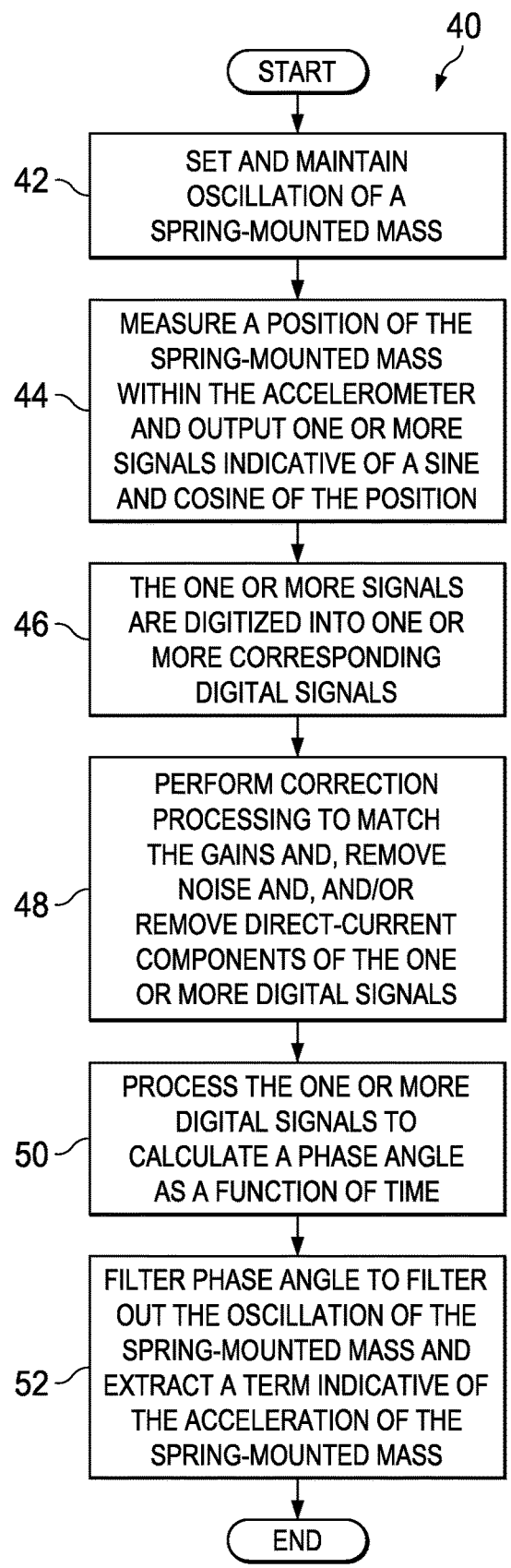
FIG. 2 illustrates an example method for determining acceleration, in accordance with embodiments of the present disclosure.

FIG. 2 illustrates an example method 40 for determining acceleration, in accordance with embodiments of the present disclosure. According to certain embodiments, method 40 may begin at step 42. As noted above, teachings of the present disclosure may be implemented in a variety of configurations of system 10 as shown in FIG. 1. As such, the preferred initialization point for method 40 and the order of the steps comprising method 40 may depend on the implementation chosen.

At step 42, a driver (e.g., driver 34) may set and maintain an oscillation of a spring-mounted mass (e.g., mass 23) of an accelerometer (e.g., accelerometer 12). In some embodiments, the driver may drive the oscillation at target magnitude indicated by a feedback signal provided to the driver. In some of such embodiments, the feedback signal may be based on a calculated acceleration of the spring-mounted mass.

At step 44, a positional encoder may measure a position of the spring-mounted mass within the accelerometer and output one or more signals indicative of a sine and cosine of the position (e.g., sin x(t) and cos x(t) in accordance with Eqs. 1 and 2 above). At step 46, the one or more signals may be digitized (e.g., by ADCs 14) into one or more corresponding digital signals.

At step 48, a correction processor (e.g., correction processor 16) may receive the digital signals representative of cos x(t) and sin x(t) and perform processing to match the gains and, remove noise and, and/or remove direct-current components of the signals. At step 50, a quadrature-to-phase converter (e.g., quadrature-to-phase converter 18) may further process the digital signals representative of cos x(t) and sin x(t) to calculate a phase angle Θ(t) as a function of time. At step 52, low-pass filter 20 may filter Θ(t) to filter out the oscillation of the spring-mounted mass and extract a term (e.g., the term $k_1 a$ as described above) indicative of the acceleration a of the spring-mounted mass.

Although FIG. 2 discloses a particular number of steps to be taken with respect to method 40, method 40 may be executed with greater or fewer steps than those depicted in FIG. 2. In addition, although FIG. 2 discloses a certain order of steps to be taken with respect to method 40, the steps comprising method 40 may be completed in any suitable order.

Method 40 may be implemented using system 10, components thereof or any other system such as that shown in FIG. 1 operable to implement method 40. In certain embodiments, method 40 may be implemented partially or fully in software and/or firmware embodied in memory or other computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An apparatus for measuring acceleration, comprising:
   a spring-mounted mass;
   a positional encoder configured to measure a position of the spring-mounted mass and output one or more signals indicative of a sine and a cosine of the position;
   a driver to set and maintain an oscillation of the spring-mounted mass; and
   a decoder configured to process the one or more signals to calculate an acceleration of the spring-mounted mass.

2. The apparatus of claim 1, further comprising a feedback control system to control a magnitude of the oscillation in such a manner to optimize measurement and accuracy of the acceleration.

3. The apparatus of claim 2, wherein the magnitude of the oscillation is such that the one or more signals have a substantially zero direct current component.

4. The apparatus of claim 1, wherein the decoder is further configured to:
   process the one or more signals to calculate a phase angle of the position as a first function of time; and
   low-pass filter the phase angle of the position as a second function of time to filter out the oscillation of the spring-mounted mass and extract the acceleration from the phase angle of the position as a third function of time.

5. The apparatus of claim 1, wherein the driver comprises a mechanical driver.

6. The apparatus of claim 1, wherein the driver comprises an electro-static driver.

7. The apparatus of claim 1, wherein the apparatus further comprises a stator mechanically coupled to the spring-mounted mass such that the spring-mounted mass oscillates relative to the stator.

8. The apparatus of claim 7, wherein:
   the stator comprises one or more first features; and
   the spring-mounted mass comprises one or more second features, each of the one or more second features corresponding to a respective one of the one or more first features;
   further wherein the one or more first features and one or more second features are arranged such that as the spring-mounted mass oscillates relative to the stator, a capacitance between each of the one or more second features and the respective first features of the second features varies.

9. The apparatus of claim 8, wherein the capacitance is indicative of at least one of the sine of the position of the spring-mounted mass and the cosine of the position of the spring-mounted mass.

10. A method comprising:
    receiving one or more positional encoder signals indicative of a sine and a cosine of a position of an oscillating spring-mounted mass; and
    processing the one or more positional encoder signals to calculate an acceleration of the oscillating spring-mounted mass.

11. The method of claim 10, further comprising a feedback control system to control a magnitude of an oscillation of the oscillating spring-mounted mass in such a manner to optimize measurement and accuracy of the acceleration.

12. The method of claim 11, wherein the magnitude of the oscillation is such that the one or more positional encoder signals have a substantially zero direct current component.

13. The method of claim 10, further comprising:
processing the one or more positional encoder signals to calculate a phase angle of the position as a first function of time; and
low-pass filtering the phase angle of the position as a second function of time to filter out an oscillation of the spring-mounted mass and extract the acceleration from the phase angle of the position as a third function of time.

14. The method of claim 10, further comprising measuring the position of the oscillating spring-mounted mass with a positional encoder configured to generate the one or more positional encoder signals.

15. The method of claim 10, further comprising setting and maintaining an oscillation of the oscillating spring-mounted mass using a driver.

16. The method of claim 15, wherein the driver comprises a mechanical driver.

17. The method of claim 15, wherein the driver comprises an electro-static driver.

* * * * *